United States Patent
Wang et al.

(10) Patent No.: US 10,288,912 B2
(45) Date of Patent: May 14, 2019

(54) TRANSFER PLATE AND ORIENTATION FILM GENERATION SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jing Wang, Beijing (CN); Jinbo Ding, Beijing (CN); Ying Zhang, Beijing (CN); Changjiang Wang, Beijing (CN); Xuchen Yuan, Beijing (CN); Xin Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 15/164,229

(22) Filed: May 25, 2016

(65) Prior Publication Data

US 2016/0347106 A1    Dec. 1, 2016

(30) Foreign Application Priority Data

May 26, 2015    (CN) .......................... 2015 1 0275271

(51) Int. Cl.
*B41F 27/06*    (2006.01)
*G02F 1/13*    (2006.01)
(Continued)

(52) U.S. Cl.
CPC ............ *G02F 1/1303* (2013.01); *B41F 17/26* (2013.01); *B41F 27/06* (2013.01); *G02F 1/133723* (2013.01)

(58) Field of Classification Search
CPC ........ B41F 27/00; B41F 27/005; B41F 27/06; B41F 27/10; B41F 27/12; B41F 27/14;
(Continued)

(56) References Cited

U.S. PATENT DOCUMENTS 3,548,996 A * 12/1970 Ellis ....................... B65G 47/66
                                                                 198/610
4,252,061 A *  2/1981 Wade, Jr. ................ B41F 27/06
                                                                 101/377
(Continued)

*Primary Examiner* — Jill E Culler
*Assistant Examiner* — Marissa Ferguson Samreth
(74) *Attorney, Agent, or Firm* — Ladas & Parry LLP

(57) ABSTRACT

A transfer plate and an orientation film generation system are provided. The transfer plate includes a bottom plate and a plurality of relief plates, wherein, the bottom plate is disposed on a printing cylinder and is distributed with a plurality of engagement holes, each of the engagement holes has a plurality of stopper locations configured to provide different engagement depths; and the plurality of relief plates and the plurality of engagement holes are disposed in one-to-one correspondence, and each of the relief plates is provided with an engagement pin cooperated with the stopper locations of a corresponding engagement hole, wherein the relief plate is made of permeable materials. The orientation film generation system includes the above transfer plate.

18 Claims, 4 Drawing Sheets

(51) Int. Cl.
*B41F 17/26* (2006.01)
*G02F 1/1337* (2006.01)

(58) Field of Classification Search
CPC ........ B41F 27/126; B41F 30/00; B41F 30/02; B41F 30/04; G02F 1/1303; G02F 1/133723
See application file for complete search history.

(56) References Cited

U.S. PATENT DOCUMENTS

| | | | | |
|---|---|---|---|---|
| 6,169,592 | B1* | 1/2001 | Choi | F25J 1/0276 349/123 |
| 6,472,121 | B2* | 10/2002 | Murphy | B41C 1/05 430/273.1 |
| 7,169,456 | B2* | 1/2007 | Kim | G02F 1/133784 101/395 |
| 9,704,821 | B2* | 7/2017 | Meitl | H01L 24/81 |
| 2008/0264284 | A1* | 10/2008 | Hutchison | B26D 7/2614 101/389.1 |
| 2016/0020131 | A1* | 1/2016 | Bower | B41F 16/00 294/213 |
| 2017/0067936 | A1* | 3/2017 | Tay | G01R 1/0408 |
| 2017/0106688 | A1* | 4/2017 | Li | B41N 1/06 |
| 2017/0217153 | A1* | 8/2017 | Jing | B41F 16/00 |

* cited by examiner

US 10,288,912 B2

TRANSFER PLATE AND ORIENTATION FILM GENERATION SYSTEM

TECHNICAL FILED

Embodiment of present invention relate to a transfer plate and an orientation film generation system.

BACKGROUND

During manufacture of a liquid crystal product, an ARP plate (transfer plate) is mainly used for coating and printing of orientation liquid (Polyimide, PI) through a roller, that is, transferring the orientation liquid onto a glass substrate so as to from a uniform coating of the orientation liquid.

At present, as illustrated in FIG. 1, a typical process of coating the orientation liquid comprises: firstly, spraying the orientation liquid 1 onto a doctor roller 4 through a nozzle 1, then transferring the orientation liquid 4 onto a anilox roller 3 by means of the doctor roller 4, then transferring the orientation liquid onto a conventional transfer plate 5 on a plate cylinder 6 by means of the anilox roller 3, and then delivering a glass substrate 8 to be beneath the transfer plate 5 by means of a base platform 7 of a printing apparatus; subsequently, transferring the orientation liquid onto the glass substrate 8 by the transfer plate 5, and pre-drying and post-drying the orientation liquid to form a desired orientation film layer.

Generally, different products have different requirements on a thickness of the orientation film. For example, for a product intended to highlight an effect of residual image, a relatively thicker orientation film is employed, whereas for a product having less demand on the effect of residual image, a normal or relatively thinner orientation film is utilized in consideration of productivity and cost. In existing transfer technologies, in order to be adapted to products having different requirements on the orientation film, it usually needs to replace the anilox roller or change a mesh depth of the APR plate. However, replacement of the anilox roller is time-consuming and labor-intensive, and hence will considerably influence the productivity; moreover, change of the mesh depth of the APR plate causes a costly redesign of the APR plate.

In addition, the APR plate itself is also expensive, which occupies a very high proportion in a preceding fabrication cost of the LCD. Furthermore, during the use of the APR plates, only a few of them experiences natural aging, but a vast majority thereof are abandoned due to external force; specifically, the entire APR plate may become disabled and have to be replaced as a whole due to, for example, a tiny scratch occurred on a printing surface thereof, which causes improved fabrication cost and resource wastage.

Therefore, in view of the above drawbacks, it's desired to provide a transfer plate capable of satisfying requirements on a thickness of the orientation film from different products with reduced cost.

SUMMARY

At least one embodiment of the present invention provides a transfer plate and an orientation film generation system, which can satisfy different requirements on film thickness from different products without increasing cost and wasting recourses.

In order to achieve the above objects, at least one embodiment of the present invention utilizes technical solutions as below.

In one aspect, a transfer plate comprising a bottom plate and a plurality of relief plates, wherein, the bottom plate is disposed on a printing cylinder and is distributed with a plurality of engagement holes, each of the engagement holes has a plurality of stopper locations configured to provide different engagement depths; and the plurality of relief plates and the plurality of engagement holes are disposed in one-to-one correspondence, and each of the relief plates is provided with an engagement pin cooperated with the stopper locations of a corresponding engagement hole, wherein the relief plate is made of permeable materials.

In the other aspect, an orientation film generation system comprising the above transfer plate.

BRIEF DESCRIPTION OF THE DRAWINGS

In order to clearly illustrate the technical solution of the embodiments of the present invention, the drawings of the embodiments will be briefly described in the following, wherein.

REFERENCE NUMERALS

Figure 1:
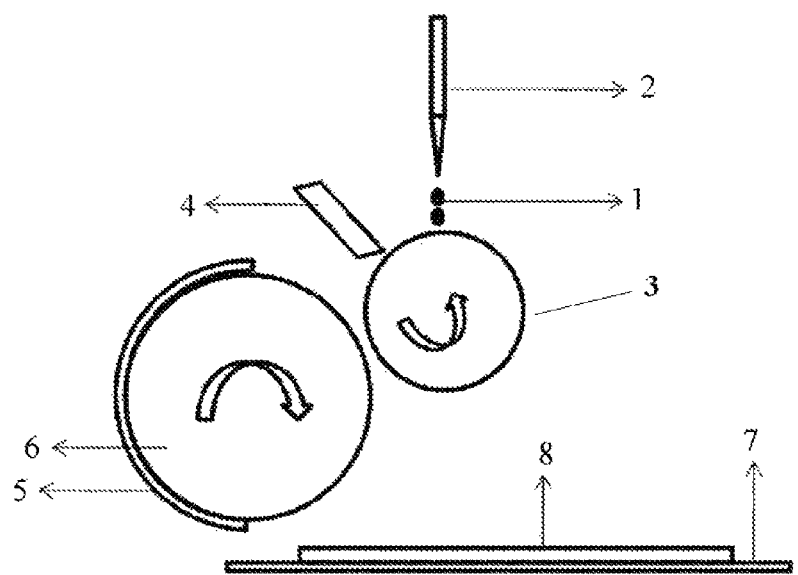
FIG. 1 is a schematically structural diagram illustrating an existing coating process of orientation liquid.

1: orientation liquid; 2: nozzle; 3: anilox roller; 4: doctor roller; 5: transfer plate; 6: plate cylinder; 7: base platform; 8: glass substrate: 9: bottom plate; 10: relief plate; 11: engagement hole; 110—stopper: 12: engagement pin; 120—groove.

DETAILED DESCRIPTION

In order to make objects, technical solutions and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly The First Embodiment As illustrated in FIGS. 2-6, a transfer plate provided by an embodiment of the present invention comprises a bottom plate 9 and a plurality of relief plates 10 disposed on the bottom plate 9, wherein a plurality of engagement holes 11 are distributed on the bottom plate 9, each of the engagement holes 11 provides several engagement depths (hereinafter referred to as stopper location), and each of the relief plates 10 is provided with an engagement pin 12 configured to cooperate with the stopper locations in the engagement hole 11.

In this embodiment, an integral engagement between the relief plates 10 and the bottom plate 9 is realized through cooperation between the engagement pins 12 on the relief plates 10 and the engagement holes 11 in the bottom plate 9.

According to the present embodiment, in view of the plurality of stopper locations provided by the engagement hole 11 and the fact that each of the engagement pins 12 can cooperate with the plurality of stopper locations provided by a corresponding engagement hole 11, the engagement pin 12 can be pushed into different stopper locations of the corresponding engagement hole 11 according to the requirements of different products, so as to obtain orientation films of different thicknesses; in this way, it is unnecessary to replace the entire transfer plate or anilox roller to be adapted to different requirements from different product, thereby saving the time, labor and also the cost; at the same time, in view of the plurality of relief plates 10 on the bottom plate 9 being independent from each other, if one of the relief plates 10 is damaged, only the damaged relief plate 10 needs to be replaced without the need of replacing other relief plates 10, thereby reducing fabrication cost and avoiding resource wastage.

In an example of this embodiment, the bottom plate 9 can be disposed on a printing cylinder 6 of an anilox rover 3, the relief plate 10 is made from permeable materials, and the engagement hole 11 has a penetrated structure. Hence, the orientation liquid on the plate cylinder 6 of the anilox rover 3 can flow into the penetrated, engagement hole 11 of the bottom plate 9, then permeates into the relief plate 10 through the engagement pin 12 retained at different stopper locations in the engagement hole 11. As a result, upon the relief plate 10 being pressed-fit with a glass substrate, the orientation liquid will be transfer-printed onto the glass substrate.

In an example of this embodiment, the engagement pins 12 and the engagement holes 11 are arranged in an array, respectively, so as to improve a uniformity of coating and printing of the orientation liquid.

Figure 2:
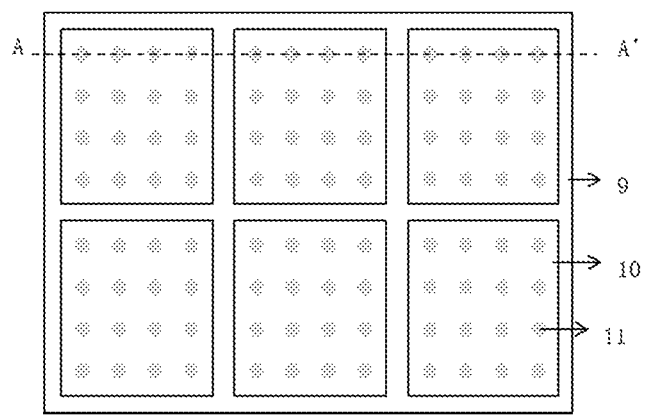
FIG. 2 is a schematically structural plan view illustrating a transfer plate according to a first embodiment of the present invention.

In an example of this embodiment, the plurality of relief plates 10 can be obtained by dividing an integral, relatively larger relief plate into several pieces as required. In general, the number of the relief plates 10 is associated with the number of Q-panels (a piece of large glass plate to be cut into chips) of the corresponding product; for example, as illustrated in FIG. 2, total six relief plates 10 are provided. However, more or less relief plates than that illustrated in the drawings can be provided in other embodiments.

Figure 3:
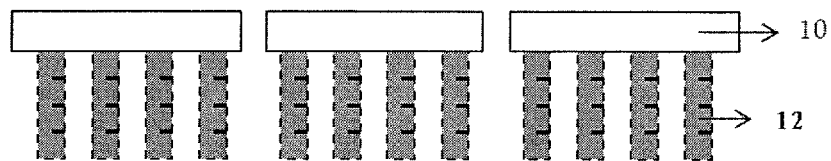
FIG. 3 is a schematically structural diagram illustrating a longitudinal section of relief plates on the transfer plate taken along line A-A' in FIG. 2.
Figure 4:
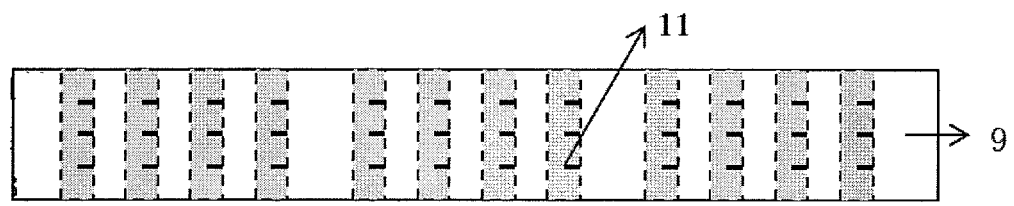
FIG. 4 is a schematically structural diagram illustrating a longitudinal section of a bottom plate on the transfer plate taken along line A-A' in FIG. 2.
Figure 5:
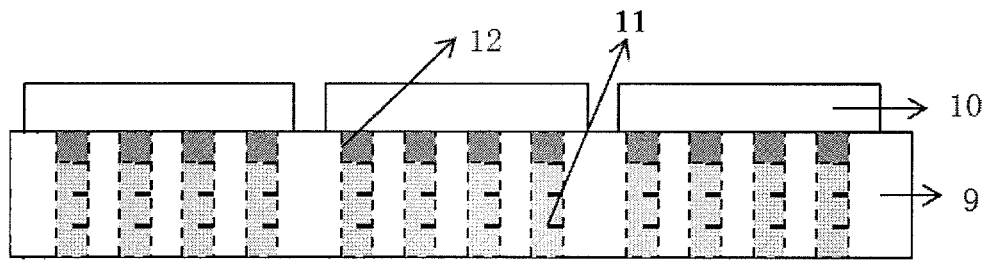
FIG. 5 is a schematically structural diagram illustrating a longitudinal section of the transfer plate taken along line A-A' in FIG. 2 (in the case where a relatively thicker orientation film is required)

In an example of this embodiment, as illustrated in FIGS. 3-5, three stopper locations can be provided in the engagement hole 11, that is, a first location, a second location, and a third location which are disposed in sequence from up to down; and each of the engagement pins 12 distributed on the relief plate 10 can be retained at different stopper locations as described so as to satisfy different processing requirements of orientation films with different thicknesses. For example, in order to ensure a better afterimage effect, it needs to obtain a relatively thicker orientation film; accordingly, when the bottom plate 9 and the relief plate 10 are brought into engagement, the relief plate 10 can be pushed to the uppermost layer of the bottom plate 9, i.e., the first location, and can be retained at the first location through a cooperation of the engagement pin 12 with the stopper 110 at the first location; then the orientation liquid can be filled to reach the first location via the penetrated engagement hole 11 in the bottom plate 9 and transferred onto the glass substrate through the relief plate 10; due to the fact that a maximum amount of orientation liquid can be filled at the first location which has the maximum depth as compared with other tow locations, the orientation film transferred onto the glass substrate accordingly has a maximum thickness. For another example, when a relatively thinner orientation film is required, the relief plate 10 can be pushed to the bottommost layer of the bottom plate 9, that is, the third location, and can be retained at the third location through a cooperation of the engagement pin 12 with the stopper 110 at the third location; then the orientation liquid can be filled to reach the third location at a minimum amount through the penetrated engagement hole 11 in the bottom plate 9, and the orientation film transferred onto the glass substrate accordingly has the minimum thickness. As above, a proper stopper location can be selected according to actual requirements for film thickness, which is convenient and flexible and also time-saving and labor-saving, thereby providing multiple usages with a single plate.

Figure 6:
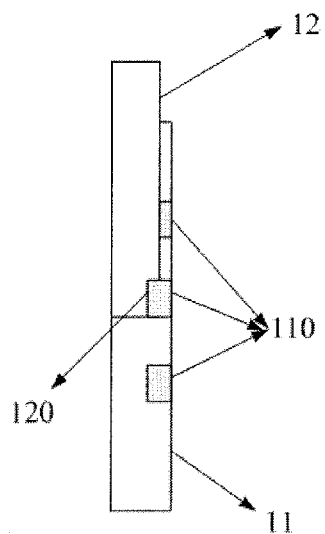
FIG. 6 is a schematic diagram illustrating a cooperation between an engagement hole and an engagement pin of the transfer plate according to the first embodiment of the present invention.

In an example of this embodiment, as illustrated in FIG. 6, the plurality of stopper locations in the engagement hole 11 can be achieved by a plurality of resilient stoppers 110 disposed at several predetermined engagement depths along an inner wall of the engagement hole 11; correspondingly, a main body of the engagement pin 12 can be provided with a receiving portion 120, for example, a groove, to be cooperated with the resilient stopper 110. In this way, upon the engagement pin 12 being inserted into the engagement hole 11, the engagement pin 12 can be moved along a depth direction of the engagement hole 11 to bypass any undesired stopper locations by utilizing an elastic property of corresponding resilient stoppers 110 and to be retained at any desired stopper locations by utilizing a cooperation of the groove 120 with the corresponding resilient stoppers 110. The stopper 110 can be made of elastomeric materials such as rubber; however, embodiments of the present invention are not limited thereto but can be formed with any materials known in the art which can achieve the above functions. In the example as illustrated in FIG. 6, the engagement pin 12 inserted into the engagement hole 11 has bypassed the first location by pressing against the stopper 110 (illustrated in a compressed state) at the first location, and is retained at the second location by receiving the stopper 110 at the second location within the groove 120.

In an example of this embodiment, adjacent two stopper locations have a height difference of 180 Å-220 Å, that is, a distance between adjacent two stoppers 110 is 180 Å-220 Å. Thus, given that orientation films actually obtained with the adjacent two stopper locations in the engagement hole 11 have a thickness difference in the order of 200 Å, then an orientation film obtained at the third location has a film thickness of about 600 Å, an orientation film obtained at the second location has a film thickness of about 800 Å, and an orientation film obtained at the first location has a film thickness of about 1000 Å. Of course, even more stopper locations can be provided based on the above examples so as to satisfy even more requirements for film thickness.

In an example of this embodiment, a material of forming the relief plate 10 is permeable photosensitive resin. In this way, since a material of forming the bottom plate 9 of the transfer plate is non-permeable photosensitive resin so that the orientation liquid can merely flow there-into via the penetrated engagement hole 11, using photosensitive resins of excellent permeability and wettability as the materials of forming the relief plate 10 allows the orientation liquid having entered the engagement hole 11 in the bottom plate 9 further permeating into a surface of the relief plate 10 through the engagement pin 12 of the relief plate 10, so as to complete a coating of the orientation liquid. By employing the permeable photosensitive resins as the materials of forming the relief plate 10, it is possible to satisfy both the permeability requirement and the photosensitive requirement of the relief plate 10. Embodiments of present invention are not intended to particularly define the permeable photosensitive resins of forming the relief plate 10 and the non-permeable photosensitive resins of forming the bottom plate 9 to any specific ones; instead, they can be flexibly selected by those skilled in the art according to actual requirements.

According to the present embodiment, for example, when six relief plates 10 and a bottom plate are integrally engaged, if abnormal conditions (e.g., scratches, defects, foreign matters) occur at one of the relief plates 10, it only needs to replace the abnormal one but not all of the relief plates, which further saves fabrication cost and avoids material wastage.

In addition, similar with conventional techniques, normal meshes of the transfer plate are disposed on the relief plates 10, which is not pertained to the contents of the present invention and will not be described in details herein.

Embodiment 2

Figure 7:
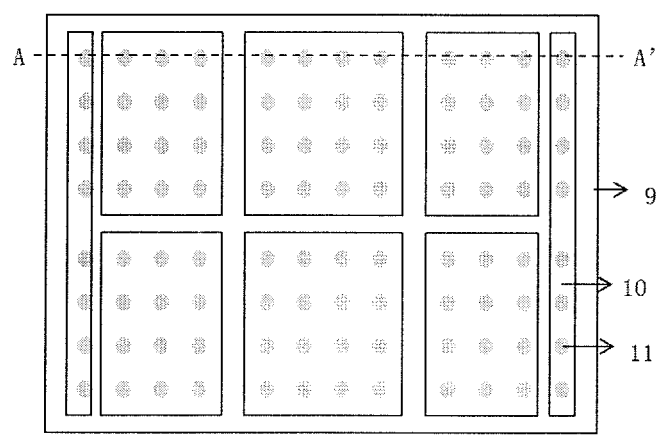
FIG. 7 is a schematically structural plan view illustrating a transfer plate according to a second embodiment of the present invention.
Figure 8:
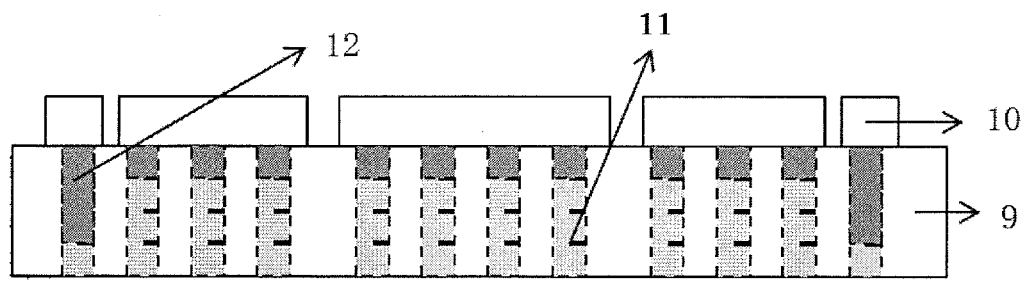
FIG. 8 is a schematically structural diagram illustrating a longitudinal section of a bottom plate on the transfer plate taken along line A-A' in FIG. 6.

FIGS. 7 and 8 illustrate a transfer plate provided by another embodiment of the present invention. As compared with the previous embodiment in which the number of the relief plates 10 is configured according to the number of the Q-panels, the present embodiment provides local adjustments to the relief plates.

Portions of an orientation film at marginal areas of a glass substrate have press-fitted edge zones, and hence have a thickness which is 100 Å~150 Å larger than that of portions at central zones. As a result, it's possible to independently design the relief plates 10 at the edge zones as required so that the engagement pins 12 of the relief plates 10 at the edge zones have a height different from that of the engagement pins 12 of the relief plates 10 at the central zones. For example, the engagement pins 12 of the relief plates 10 corresponding to the central zones of the bottom plate 9 can be shorter than the engagement pins 12 of the relief plates 10 corresponding to the edge zones of the bottom plate 9; for example, the engagement pins 12 of the relief plates 10 at the edge zones can be designed to have a length cooperated with the second and third locations in the engagement holes 11 of the bottom plate 9, while the engagement pins 12 of the relief plates 10 at other zones can be designed to have a length merely cooperated with the first and second locations in the engagement holes 11 of the bottom plate 9; that is, when the relief plates 10 at the edge zones are cooperated with the bottom plate 9 in the third location, the relief plates 10 at the central zones are cooperated with the bottom plate 9 in the first or second location; when the relief plates 10 at the edge zones are cooperated with the bottom plate 9 in the second location, the relief plates 10 at the central zones are cooperated with the bottom plate 9 in the first location; finally, a film having a uniform thickness in its entirety is obtained.

In an example of this embodiment, as illustrated in FIG. 7, a plurality of relief plates 10 are provided with different surface areas and shapes, in which the relief plate 10 at the edge zones is elongated, with a surface area smaller than that of the relief plate 10 at the central zones, so as to allow relief plates 10 having longer engagement pins 12 to be disposed at the edge zones.

Figure 9:
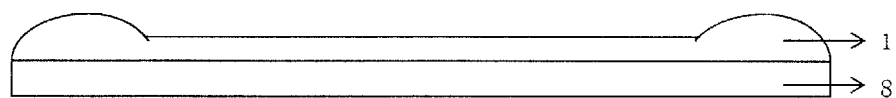
FIG. 9 is a schematic diagram illustrating a longitudinal section of an orientation film obtained through existing techniques.
Figure 10:
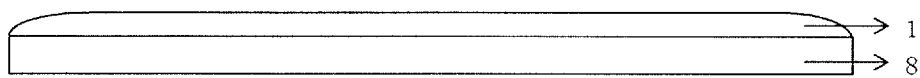
FIG. 10 is a schematic diagram illustrating a longitudinal section of an orientation film obtained by using the transfer plate according to the second embodiment of the present invention.

As illustrated in FIG. 9, the orientation film obtained by using techniques known in the art is thicker at its edge zones, which results in the overall film thickness non-uniform; By contrast, as illustrated in FIG. 10, with the use of the transfer plate provided by the embodiments of present invention, since the engagement pins 12 of the relief plates 10 corresponding to the central zones of the bottom plate 9 is shorter than the engagement pins 12 of the relief plates 10 corresponding to the edge zones of the bottom plate 9, the orientation liquid has a less permeation amount at the edge zones so that the press-molded orientation film is not relatively thicker at its edge zones, which results in an uniform film thickness in its entirety.

Embodiments of present invention further provide an orientation film generation system comprising the transfer plate according to any one of the above embodiments. With the orientation film generation system provided by the embodiment of the present invention, it is possible to produce an orientation film of uniform thickness and also to satisfy different requirements of different products in terms of the film thickness; as a result, the cost is reduced, the resources wastage and reduction of production efficiency is also avoided.

As above, in the transfer plate and orientation film generation system provided by the embodiments of the present invention, the engagement hole 11 in the bottom plate 9 can provide a plurality of stopper locations, while the engagement pin 12 on the relief plate 10 can be cooperated with the plurality of stopper locations in the engagement hole 11, so that the relief plate 10 can be pushed into different stopper locations to obtain orientation films of different thicknesses according to different requirements of different products in terms of the film thickness. In this way, it is unnecessary to replace the entire transfer plate or the anilox roller to be adapted to the changes in thickness requirements, which is time-saving and labor-saving and also reduces the cost; at the same time, since the plurality of relief plates 10 on the bottom plate 9 are independent from each other, when one of the relief plates 10 is damaged, it only needs to replace the damaged relief plate 10 but the other ones remain the same, which can reduce fabrication cost and avoid resources wastage; furthermore, by designing back sides of the relief plates 10 corresponding to different zones of the bottom plate 9 to have engagement pins 12 of different heights, for example, by allowing the engagement pin 12 of the relief plate 10 corresponding to the central zone of the bottom plate 9 being shorter than the engagement pin 12 of the relief plate 10 corresponding to the edge zone of the bottom plate 9, an orientation film having an uniform film thickness in its entirety can be obtained, thereby improving the yield rate of the orientation film.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201510275271.2 titled "A TRANSFER PLATE" filed on May 26, 2015, which is incorporated herein by reference in its entirely

What is claimed is:

1. A transfer plate comprising a bottom plate and a plurality of relief plates, wherein,
    the bottom plate is capable of being detachably installed on a printing cylinder provided with an orientation liquid, and is distributed with a plurality of engagement holes, each of the plurality of engagement holes has a plurality of stopper locations configured to provide different engagement depths; and
    the plurality of relief plates are disposed to be corresponding to the plurality of engagement holes, and each of the plurality of relief plates is provided with an engagement pin cooperated with the stopper locations of a corresponding engagement hole, wherein
    each of the plurality of relief plates is made of a permeable material, and the bottom plate is made of a non-permeable material, and
    the orientation liquid on the printing cylinder is configured to enter the bottom plate through the engagement hole and then permeate into the relief plate through the engagement pin.

2. The transfer plate according to claim 1, wherein the plurality of relief plates comprises relief plates of different surface areas and different shapes.

3. The transfer plate according to claim 1, wherein the plurality of relief plates comprises relief plates provided with engagement pins of different lengths.

4. The transfer plate according to claim 3, wherein a relief plate of the plurality of relief plates corresponding to a central zone of the bottom plate has an engagement pin shorter than an engagement pin of a relief plate of the plurality of relief plates corresponding to an edge zone of the bottom plate.

5. The transfer plate according to claim 1, wherein each of the plurality of engagement holes provides three stopper locations.

6. The transfer plate according to claim 5, wherein the engagement depths provided by adjacent stopper locations have a depth difference of 180 Å-220 Å.

7. The transfer plate according to claim 1, wherein a plurality of resilient stoppers is disposed along a depth direction on an inner wall of each of the plurality engagement holes, and the engagement pin is provided with a groove configured to receive the stopper.

8. The transfer plate according to claim 1, wherein a material of each of the plurality of relief plates is permeable photosensitive resin.

9. The transfer plate according to claim 1, wherein the plurality of engagement pins and the plurality of engagement holes are arranged in an array, respectively.

10. An orientation film generation system comprising a transfer plate, the transfer plate comprises a bottom plate and a plurality of relief plates, wherein,
    the bottom plate is capable of being detachably installed on a printing cylinder and is distributed with a plurality of engagement holes, each of the plurality of engagement holes has a plurality of stopper locations configured to provide different engagement depths; and
    the plurality of relief plates are disposed to be corresponding to the plurality of engagement holes, and each of the plurality of relief plates is provided with an engagement pin cooperated with the stopper locations of a corresponding engagement hole, wherein each of the plurality of relief plates is made of a permeable material, and the bottom plate is made of a non-permeable material, and
    the orientation liquid on the printing cylinder is configured to enter the bottom plate through the engagement hole and then permeate into the relief plate through the engagement pin.

11. The orientation film generation system according to claim 10, wherein the plurality of relief plates comprises relief plates of different surface areas and different shapes.

12. The orientation film generation system according to claim 10, wherein the plurality of relief plates comprises relief plates provided with engagement pins of different lengths.

13. The orientation film generation system according to claim 10, wherein a relief plate of the plurality of relief plates corresponding to a central zone of the bottom plate has an engagement pin shorter than an engagement pin of a relief plate of the plurality of relief plates corresponding to an edge zone of the bottom plate.

14. The orientation film generation system according to claim 10, wherein each of the plurality of engagement holes provides three stopper locations.

15. The orientation film generation system according to claim 14, wherein engagement depths provided by adjacent stopper locations have a depth difference of 180 Å-220 Å.

16. The orientation film generation system according to claim 10, wherein a plurality of resilient stoppers is disposed along a depth direction on an inner wall of each of the plurality of engagement holes, and the engagement pin is provided with a groove configured to receive the stopper.

17. The orientation film generation system according to claim 10, wherein a material of each of the plurality of relief plates is permeable photosensitive resin.

18. The orientation film generation system according to claim 10, wherein the plurality of engagement pins and the plurality of engagement holes are arranged in an array, respectively.

\* \* \* \* \*